5382X
I. JENNINGS.
LAMP.
Patented Mar. 3, 1829.
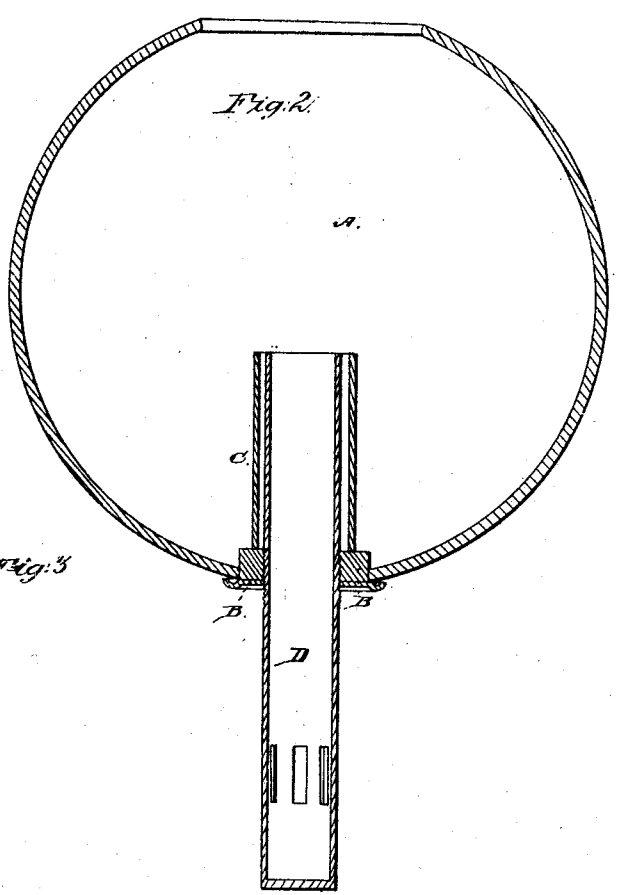
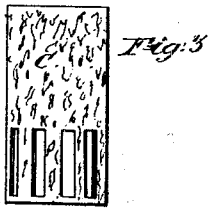
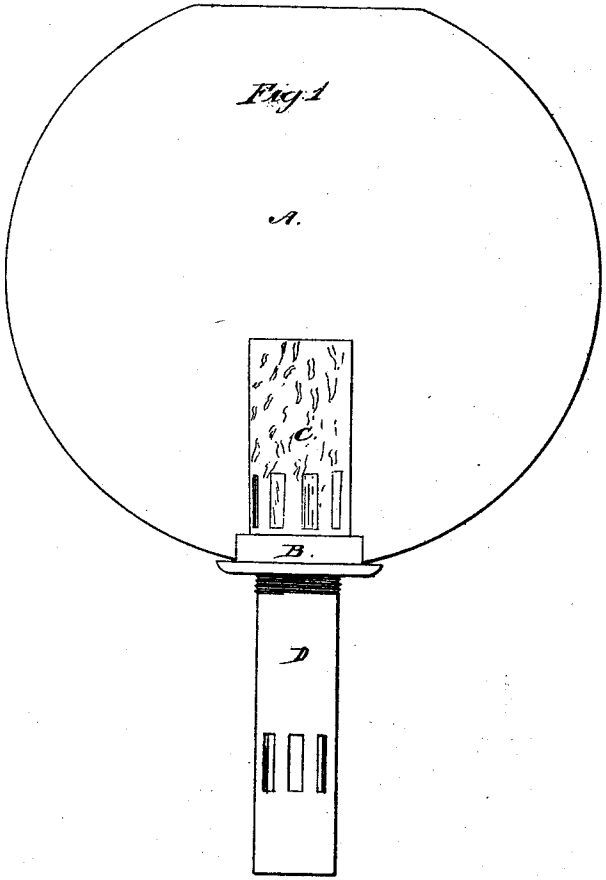
THE NORRIS PETERS CO., PHOTO-LITHO., WASHINGTON, D. C.

MISSING PAGE TEMPORARY NOTICE

PATENT # 5382X FOR ISSUE DATE 3-3-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text